United States Patent
Gracey et al.

(10) Patent No.: US 10,848,578 B1
(45) Date of Patent: Nov. 24, 2020

(54) SYSTEMS AND METHODS FOR CONTENT DELIVERY

(71) Applicant: Wells Fargo Bank, N.A., San Francisco, CA (US)

(72) Inventors: Daniel Gracey, Lake Saint Louis, MO (US); Scott Welz, Kirkwood, MO (US); Tyua Larsen Fraser, Livermore, CA (US); Matthew J. Kaufman, St. Louis, MO (US); Gwendoria M. Salley, Rock Hill, SC (US); Mark Lee Tabor, St. Louis, MO (US); Jefferson Crew, Plano, TX (US); John C. Brenner, Chesterfield, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 87 days.

(21) Appl. No.: 15/484,419

(22) Filed: Apr. 11, 2017

(51) Int. Cl.
*H04L 29/08* (2006.01)

(52) U.S. Cl.
CPC ............ *H04L 67/22* (2013.01); *H04L 67/306* (2013.01); *H04L 67/20* (2013.01)

(58) Field of Classification Search
CPC ..... H04L 67/22; H04L 67/306; H04N 21/251; H04N 21/25891; H04N 21/44222; H04N 21/4668; H04N 21/4755
See application file for complete search history.

(56) References Cited

U.S. PATENT DOCUMENTS

| | | |
|---|---|---|
| 6,671,805 B1 | 12/2003 | Brown et al. |
| 7,016,870 B1 | 3/2006 | Jones et al. |
| 7,055,094 B2 | 5/2006 | Imielinski et al. |
| 7,319,881 B2 | 1/2008 | Endo |
| 7,788,155 B2 | 8/2010 | Jones et al. |
| 7,945,783 B2 | 5/2011 | Kent et al. |
| 8,010,663 B2 | 8/2011 | Firminger et al. |

(Continued)

FOREIGN PATENT DOCUMENTS

WO 2011094734 8/2011

OTHER PUBLICATIONS

"U.S. Appl. No. 15/484,426, Non Final Office Action dated Feb. 28, 2019", 11 pgs.

(Continued)

*Primary Examiner* — Shean Tokuta
(74) *Attorney, Agent, or Firm* — Schwegman Lundberg & Woessner, P.A.

(57) ABSTRACT

A system includes at least one hardware processor and a memory storing instructions that, when executed by the at least one hardware processor, cause the at least one hardware processor to perform operations including receiving consumption data associated with a user consuming content on one or more user computing devices, determining a preference associated with content consumption of the user based on the received consumption data, the preference including one or more of a delivery time, a computing device of the one or more user computing devices, and a venue, receiving a new content item, determining one or more of a target delivery time, a target computing device of the one or more user computing devices, and a target venue based on the determined preference, and transmitting the new content item to the target computing device for presentation to the user.

14 Claims, 7 Drawing Sheets

(56) References Cited

U.S. PATENT DOCUMENTS

| | | | |
|---|---|---|---|
| 8,122,020 B1 | 2/2012 | Donsbach et al. | |
| 8,150,617 B2 | 4/2012 | Manber et al. | |
| 8,185,463 B1 | 5/2012 | Ball | |
| 8,234,302 B1* | 7/2012 | Goodwin | G06F 21/10 707/783 |
| 8,281,037 B2 | 10/2012 | Julia et al. | |
| 8,407,125 B2 | 3/2013 | Jenson et al. | |
| 8,635,519 B2 | 1/2014 | Everingham et al. | |
| 8,966,362 B2 | 2/2015 | Smetters et al. | |
| 8,978,079 B2 | 3/2015 | Pfeffer et al. | |
| 9,083,746 B2 | 7/2015 | Hamid | |
| 9,172,699 B1* | 10/2015 | Vazquez | H04L 63/0861 |
| 9,223,837 B2 | 12/2015 | Djugash | |
| 9,342,842 B2 | 5/2016 | Sanghavi et al. | |
| 9,380,332 B1* | 6/2016 | Mills | H04N 21/43 |
| 9,658,882 B1* | 5/2017 | Fullmer | G06F 9/4881 |
| 10,083,222 B1* | 9/2018 | Katzer | G06F 16/951 |
| 10,089,072 B2 | 10/2018 | Piersol et al. | |
| 10,305,835 B2 | 5/2019 | James et al. | |
| 10,367,687 B1* | 7/2019 | Soderlind | H04L 41/0886 |
| 10,666,751 B1 | 5/2020 | Price et al. | |
| 2004/0002972 A1 | 1/2004 | Pather et al. | |
| 2007/0112668 A1 | 5/2007 | Celano et al. | |
| 2008/0147484 A1* | 6/2008 | Davis | G06Q 30/02 705/14.53 |
| 2010/0169910 A1* | 7/2010 | Collins | G06Q 30/0251 725/14 |
| 2010/0183132 A1 | 7/2010 | Satyavolu et al. | |
| 2010/0325710 A1* | 12/2010 | Etchegoyen | G06F 21/31 726/7 |
| 2011/0138064 A1* | 6/2011 | Rieger | G06F 16/9577 709/228 |
| 2011/0225417 A1* | 9/2011 | Maharajh | G06F 21/10 713/150 |
| 2011/0258049 A1 | 10/2011 | Ramer et al. | |
| 2012/0078937 A1* | 3/2012 | Hall | G06F 16/435 707/767 |
| 2012/0084248 A1 | 4/2012 | Gavrilescu | |
| 2012/0290926 A1 | 11/2012 | Kapadia et al. | |
| 2012/0302258 A1 | 11/2012 | Pai et al. | |
| 2013/0080907 A1* | 3/2013 | Skelton | H04N 21/4667 715/738 |
| 2013/0125017 A1 | 5/2013 | Kaghazian | |
| 2013/0152128 A1* | 6/2013 | Tanna | H04N 21/4126 725/39 |
| 2013/0166580 A1* | 6/2013 | Maharajh | H04L 65/605 707/758 |
| 2013/0191926 A1* | 7/2013 | Chow | G06Q 30/00 726/26 |
| 2013/0325598 A1 | 12/2013 | Shao et al. | |
| 2013/0325858 A1* | 12/2013 | Xu | G06F 16/335 707/730 |
| 2013/0325952 A1 | 12/2013 | Draznin et al. | |
| 2014/0032634 A1 | 1/2014 | Pimmel et al. | |
| 2014/0040979 A1 | 2/2014 | Barton et al. | |
| 2014/0075328 A1* | 3/2014 | Hansen | G06F 3/0487 715/747 |
| 2014/0114735 A1 | 4/2014 | Isaacson et al. | |
| 2014/0274144 A1* | 9/2014 | Des Jardins | H04N 21/25841 455/456.3 |
| 2014/0282102 A1 | 9/2014 | Avrahami | |
| 2014/0330769 A1 | 11/2014 | Nguyen et al. | |
| 2014/0365586 A1 | 12/2014 | Friborg, Jr. | |
| 2014/0372429 A1 | 12/2014 | Ziklik et al. | |
| 2015/0032366 A1 | 1/2015 | Man et al. | |
| 2015/0046598 A1 | 2/2015 | Andrews et al. | |
| 2015/0066978 A1 | 3/2015 | Chakra et al. | |
| 2015/0081763 A1* | 3/2015 | Sipola | A61B 5/00 709/203 |
| 2015/0082212 A1 | 3/2015 | Sharda | |
| 2015/0127124 A1 | 5/2015 | Kobayashi | |
| 2015/0242063 A1 | 8/2015 | Lindo et al. | |
| 2015/0242645 A1 | 8/2015 | Burger et al. | |
| 2015/0324554 A1* | 11/2015 | Durbha | G06F 21/10 726/26 |
| 2015/0350356 A1 | 12/2015 | Linn et al. | |
| 2015/0350814 A1 | 12/2015 | Krochmal et al. | |
| 2015/0373065 A1 | 12/2015 | Holmquist et al. | |
| 2015/0379583 A1 | 12/2015 | Balasubramanian et al. | |
| 2016/0034160 A1 | 2/2016 | Kaltner et al. | |
| 2016/0044351 A1* | 2/2016 | Levicki | H04N 21/2541 725/25 |
| 2016/0063850 A1 | 3/2016 | Yang et al. | |
| 2016/0134488 A1* | 5/2016 | Straub | G06F 21/44 726/4 |
| 2016/0142783 A1* | 5/2016 | Bagga | H04N 21/47214 725/47 |
| 2016/0156972 A1* | 6/2016 | Oztaskent | H04N 21/44222 725/14 |
| 2016/0182658 A1* | 6/2016 | Allinson | H04L 67/1097 709/224 |
| 2016/0294909 A1* | 10/2016 | Killick | H04W 4/21 |
| 2016/0316280 A1* | 10/2016 | Bulley | H04N 21/251 |
| 2016/0334979 A1* | 11/2016 | Persson | G06F 3/04847 |
| 2016/0371689 A1 | 12/2016 | Brown et al. | |
| 2017/0034227 A1 | 2/2017 | Yang et al. | |
| 2017/0104840 A1* | 4/2017 | Spagnola | H04L 67/303 |
| 2017/0140285 A1* | 5/2017 | Dotan-Cohen | G06F 3/038 |
| 2017/0195435 A1* | 7/2017 | Sarukkai | H04L 67/22 |
| 2017/0195731 A1* | 7/2017 | Girlando | H04N 21/4668 |
| 2017/0201571 A1* | 7/2017 | Sherf | H04N 21/00 |
| 2017/0272505 A1* | 9/2017 | Smith | H04L 51/04 |
| 2017/0289737 A1 | 10/2017 | Bataller et al. | |
| 2017/0332140 A1 | 11/2017 | Blake et al. | |
| 2017/0357495 A1 | 12/2017 | Crane et al. | |
| 2018/0063121 A1* | 3/2018 | Demange | H04L 63/0876 |
| 2018/0167342 A1 | 6/2018 | Lewis et al. | |
| 2018/0167349 A1 | 6/2018 | James et al. | |
| 2018/0176270 A1 | 6/2018 | Griffin et al. | |
| 2018/0196880 A1 | 7/2018 | Carter | |
| 2018/0227789 A1 | 8/2018 | Kothapalli et al. | |
| 2018/0254959 A1 | 9/2018 | Mantyjarvi et al. | |

OTHER PUBLICATIONS

U.S. Appl. No. 15/484,426, filed Apr. 11, 2017, Systems and Methods for Optimizing Information Collaboration.

"U.S. Appl. No. 15/393,070, Response filed Nov. 11, 2019 to Final Office Action dated Jun. 11, 2019", 9 pgs.

"U.S. Appl. No. 15/484,426, Response filed Nov. 26, 2019 to Final Office Action dated Jun. 27, 2019", 10 pgs.

"U.S. Appl. No. 15 393,070, Non Final Office Action dated Dec. 13, 2018", 12 pgs.

"U.S. Appl. No. 15 393,070, Response filed May 13, 2019 to Non Final Office Action dated Dec. 13, 2018", 8 pgs.

"U.S. Appl. No. 15 484,426, Response filed May 28, 2019 to Non Final Office Action dated Feb. 28, 2019", 10 pgs.

"U.S. Appl. No. 15 393,070, Final Office Action dated Jun. 11, 2019", 16 pgs.

"U.S. Appl. No. 15/484,426, Final Office Action dated Jun. 27, 2019", 11 pgs.

U.S. Appl. No. 15/393,070, filed Dec. 28, 2016, Notification System and Method.

"U.S. Appl. No. 15/393,070, Notice of Allowance dated Jan. 17, 2020".

"U.S. Appl. No. 15/393,070, Corrected Notice of Allowability dated Feb. 18, 2020".

"U.S. Appl. No. 15/484,426, Notice of Allowance dated Jun. 4, 2020".

* cited by examiner

SYSTEMS AND METHODS FOR CONTENT DELIVERY

TECHNICAL FIELD

Embodiments described herein generally relate to computing systems and, for example and without limitation, to software systems and methods for delivering content to a user.

BACKGROUND

As people conduct their daily lives, they consume many different types of content. For example, during any given day, a particular person may watch a news program, read emails, browse the Internet, listen to the radio, and use various computer applications. Further, that person may consume such content on a variety of different devices, such as watching the news program via their home television, or reading emails via their mobile phone, or browsing the Internet via their tablet, or listening to their car radio, or logging into their investment account to evaluate their portfolio. In many situations, the person may be determining what type of content to consume, and on which device to consume that content, and when to consume that content.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
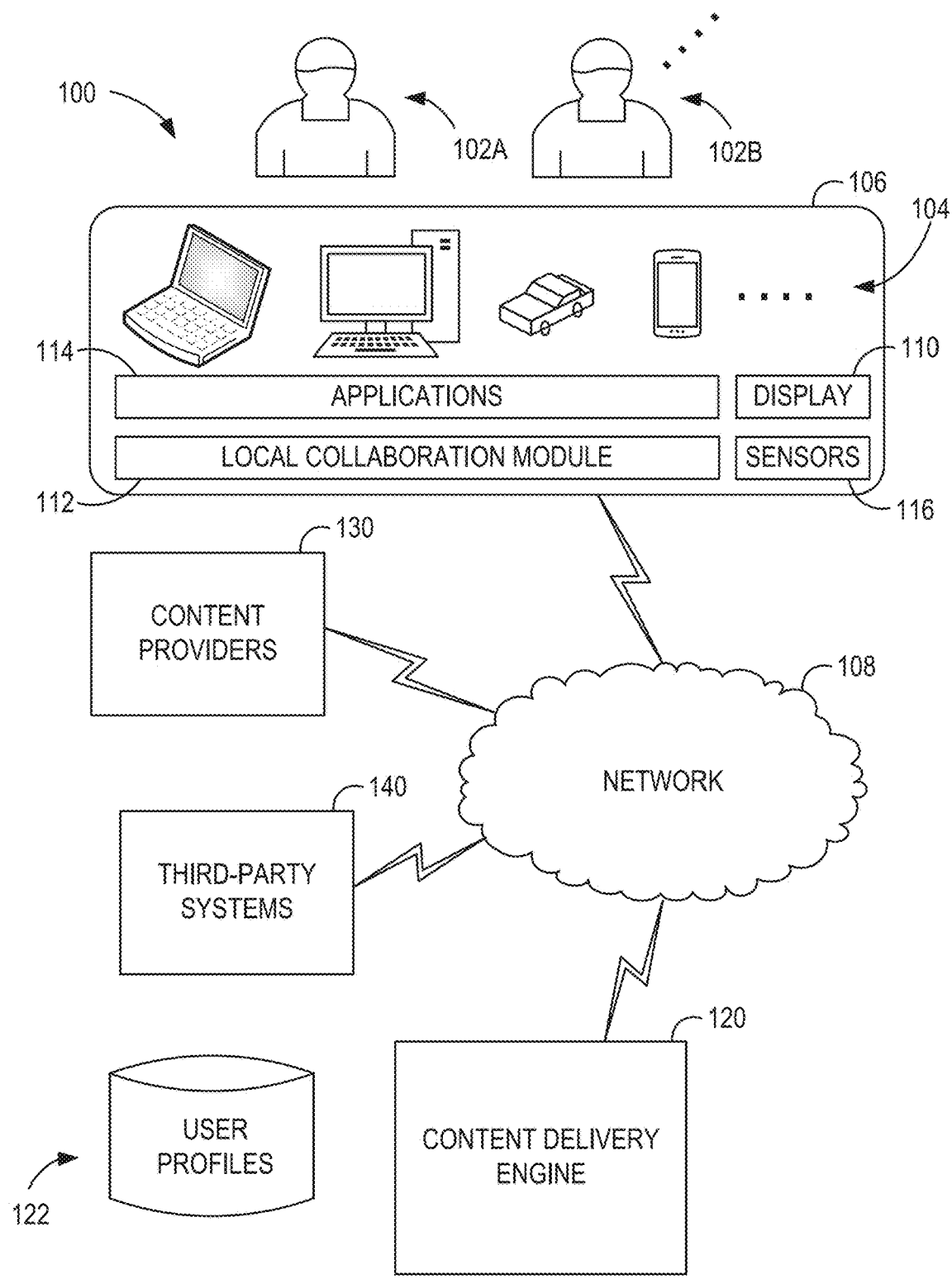
FIG. 1 illustrates an example networked environment including components of a content delivery system for evaluating content consumption by the user and presenting new content to the user.

The systems and methods described herein, for example, describe a technical solution for evaluating content consumption patterns of a user. Users may exhibit patterns of behavior relative to, for example, the types of content they prefer to consume, or the devices on which they consume such content, or the venues within those devices through which they consume such content, or the times they tend to consume such content. Such patterns of content consumption may indicate preferences for the user and, as such, may provide indications of favorable aspects of content delivery.

A content delivery system is described herein that can automatically evaluate various content consumption patterns of a user, and may use such patterns to determine additional content for the user, and how to deliver such content to the user. In an example embodiment, the content delivery system includes three main stages of operation: consumption evaluation, content staging, and content delivery.

Content evaluation, in an example embodiment, includes evaluating multiple aspects of content consumption of the user. The content delivery system may identify which devices the user uses to consume content. For example, the user may own a variety of home devices, such as a television, a personal computer, or a nest device. The user may also own various mobile devices such as a smartphone, a tablet computer, a portable media player, a wearable device, or an automobile having a car stereo or a car computer. The user may also interact with other devices such as a work computer at their office. The content delivery system identifies which of these devices the user accesses.

Further, in an example embodiment, the content delivery system monitors use of these devices to evaluate content consumption patterns of the user. Content consumption may include what type of content the user tends to consume, when (e.g., what time of day) the user tends to consume such content, on which device the user tends to consume such content, and within which venue on the device the user tends to consume such content. For example, the user may tend to watch a morning news program through their television while eating breakfast, and may evaluate their investment portfolio via an app on their mobile device while commuting to work, and may browse the Internet (e.g., social media, or online news, or third-party web sites) on their work computer during their lunch, and may listen to market news on a radio station feed via a car tuner during their commute home, and may watch an investment podcast via their portable media player while exercising in the evening. The content delivery system evaluates such content consumption over time to develop types of content of interest to the user, as well as preferred devices, venues, and times for such content consumption.

The content delivery system may then identify new content that may be of interest to the user based on, for example, the types of content historically consumed by the user, or other profile information for the user. For example, the user may have regularly listened to news regarding economic markets (e.g., stock markets), or may frequently check the value of a particular stock (e.g., via an Internet market news source), may have configured an alert regarding that particular stock's performance to be delivered via their smartwatch, or may be known to have an investment position in a particular stock (e.g., via a portfolio provided by an investment services firm). As such, the content delivery system may identify such a subject matter of interest to the user ("target subject matter"). The content delivery system may receive or otherwise identify a content item associated with the target subject matter, and may stage that "selected content item" for delivery to the user.

In an example embodiment, the content delivery system determines when to deliver the selected content item to the user ("target time"), and on which device ("target device") and venue within that device ("target venue") to deliver the selected content item to the user. The content delivery system uses the historical content consumption patterns of the user to determine such target time, device, and venue. For example, historically, when the user consumes market news, the user may have exhibited a tendency to consume that market news 70% of the time on their way home from work, 25% of the time in the evening between the hours of 7 pm and 8 pm, and 5% during other times. Further, the user may have used their mobile phone 60% of the time while consuming that market news, 20% of the time on a tablet device, 15% of the time on their television, and 5% on other devices. As such, when the content delivery system stages a selected content item related to market news for the user, the content delivery system may determine to deliver that content item to the user via their mobile phone, and while the user is on their way home from work. As such, the user automatically receives content of interest, and at a preferable time, and via a preferred device and venue.

In some embodiments, the content delivery system may distinguish between preferred devices while the user is using multiple devices. For example, in some situations, the user may have their television on and tuned into a market news program while the user is also accessing a news website featuring an article regarding political developments in the middle-east. The content delivery system may examine such use of multiple devices to distinguish whether the user is more interested in the market news, or in political developments in the middle-east. If, for example, the user actively uses the tablet (e.g., scrolling, clicking, or otherwise interacting with the device), then the content delivery system may weigh that time toward middle-east politics over market news. On the other hand, if there is limited or no activity on the tablet, then the content delivery system may weigh that time toward market news (e.g., presuming that the user's focus is more directed toward the television). As such, the content delivery system may distinguish user focus between content consumption on multiple devices.

FIG. 1 illustrates an example networked environment including components of a content delivery system 100 for evaluating content consumption by the user 102 and presenting new content to the user 102. In an example embodiment, the content delivery system 100 includes a content delivery engine 120 communicatively coupled to a pool 106 of one or more user computing devices 104 (e.g., smartphones, laptop or desktop personal computers, tablet devices, smart TVs, wearable computing devices, automobile computers, automobile radios, and so forth) via a network 108. The computing devices 104 may be owned by the user 102, or are otherwise computing devices 104 with which the user 102 interacts (e.g., regularly during their daily lives).

In an example embodiment, each of the computing devices 104 includes a display 110 (e.g., monitor, touch screen, head-mounted display), and optionally an audio device (not separately depicted), through which the user 102 consumes content. The computing devices 104 may include a local content module 112, one or more software applications (or just "applications" or "apps") 114, and one or more sensors 116. The local content module 112 may work in conjunction with the content delivery engine 120, for example, to evaluate content consumed by the user 102 via that particular computing device 104, or to present content to the user 102. Applications 114 may include, for example, web browsers, software applications (e.g., mobile apps, third party applications), video or audio players, and so forth. While there is only one display 110, local content module 112, applications 114, and sensors 116 depicted in FIG. 1, it should be understood that each computing device 104 may have any or all of these components.

In an example embodiment, the user computing devices 104 may also be in communication with or otherwise include one or more sensors 116. Sensors 116 may include a global positioning system (GPS) receiver configured to determine a location of the user 102, or health/fitness sensors such as biometric sensors (e.g., tracking heart rate, number of steps, blood pressure, level of exercise, and so forth), or orientation sensors (e.g., in a head mounted display, to determine an orientation of a head of the user 102). Sensor data from sensors 116 may be used to detect certain aspects of content consumption by the user 102, as described in further detail below.

In an example embodiment, the user computing devices 104 receives content from content providers 130. The user 102 consumes such content through their computing devices 104 during the course of their daily life. Content providers 130 vary based on the actions of the user 102 and the content they seek to consume. For example, and by no way as limitation, content providers 130 may include news outlets (e.g., via online web sites, radio stations, cable television networks, or other news service providers), social media networks (e.g., personal or professional social network feeds), video services (e.g., online streaming services, television networks), market data providers, web content providers, cellular network providers, advertisers, search engines, and so forth. While some example content providers 130 are provided here by way of example, it should be understood that any provider of content that may be consumed by the user 102 via the computing devices 104 may be a content provider 130.

In an example embodiment, the content delivery engine 120 and the user computing devices 104 are communicatively coupled to third-party systems 140 that provide data associated with the user 102 or content consumption associated with the user 102. Third-party systems 140 may include, for example, banking institutions hosting bank accounts of the user 102, financial service providers that provide investment services to the user 102, social networks on which the user 102 has an account, financial lenders underwriting loans made to the user 102, payment card providers providing payment cards for the user 102, news sources, online merchants, or other service providers or other third parties with which the user 102 may access via the computing devices 104.

The content delivery engine 120 also includes content consumption profiles 122. In the example embodiment, the content consumption profiles 122 are stored in a database (not separately shown), such as a configuration file or a relational database. The content consumption profiles 122 store content consumption information associated with the user 102, such as historical content consumption information, content preference information, information on the pool 106 of devices 104 through which the user 102 consumes content, and so forth. Such profile data may be used during evaluation of content consumption and presentation of new content for the user 102.

During operation, in an example embodiment, the content delivery system 100 detects or otherwise associates the pool 106 of computing devices 104 with the user 102. In some embodiments, the user 102 may self-identify computing devices 104 they own or with which they interact. In other some embodiments, the content delivery system 100 may automatically determine which computing devices 104 the user 102 uses to consume content. The content delivery engine 120 then examines aspects of content consumption by the user 102 using those devices over time. The content delivery engine 120 may examine aspects such as what time of day the user 102 consumes content, what computing device 104 from the pool 106 the user 102 uses to consume that content, what venue within the computing device 104 the user 102 used to consume that content, and the type of content consumed. Over time, the content delivery engine 120 builds a content consumption profile (or just "consumption profile") for the user 102.

In an example embodiment, the content delivery system 100 may then receive or otherwise identify a selected content item of interest to the user 102. Based on the consumption profile, the content delivery system 100 determines one or more target specifications associated with presenting the selected content item to the user 102: a target delivery time, a target device from the device pool 106, and a target venue within that target device through which to deliver that selected content item. The content delivery engine 120 may stage the selected content item (e.g., transmitting the selected content item to the target device). When the target delivery time is reached, the selected content item is presented to the user 102 via the target device and target venue. In some embodiments, the content delivery system 100 may evaluate device activity on the target device. The content delivery system 100 may wait until the user 102 activates the target device or target venue before presenting the selected content item.

Figure 2:
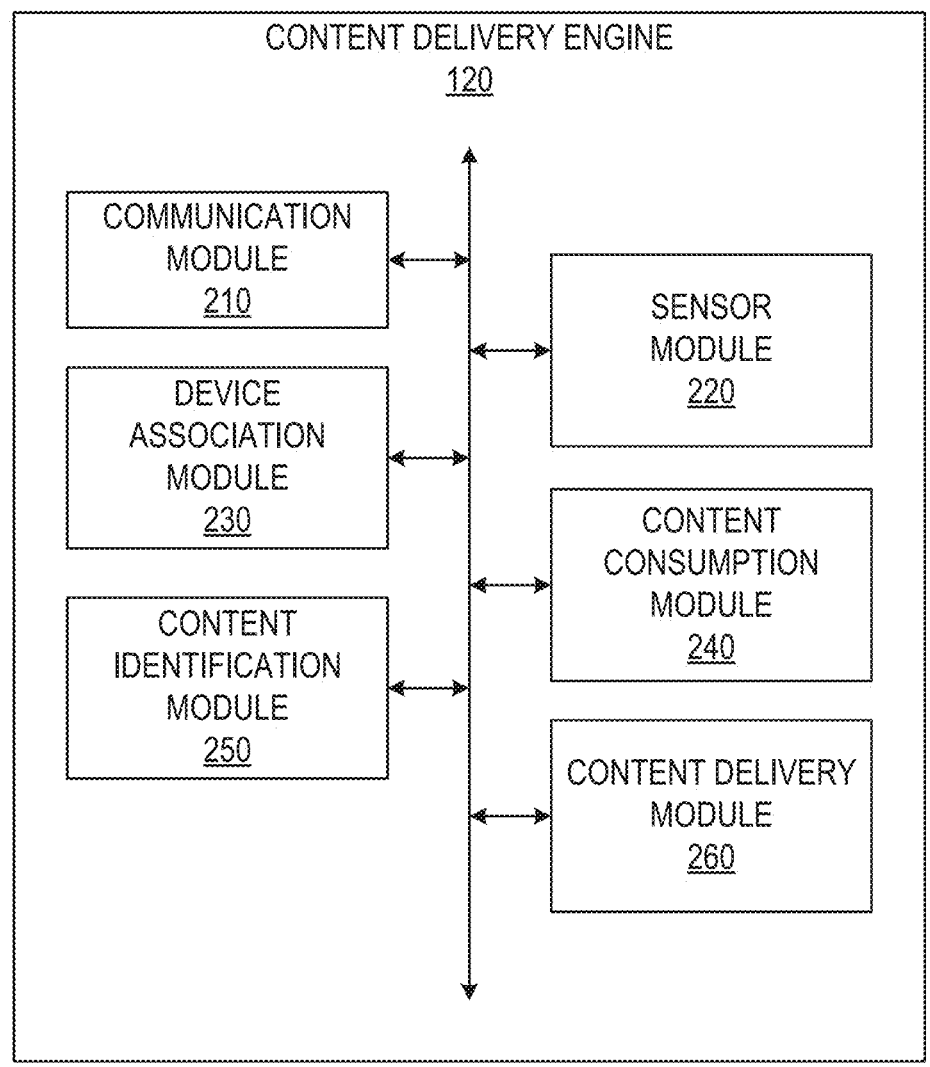
FIG. 2 is a block diagram showing components within the content delivery engine, according to some embodiments.

FIG. 2 is a block diagram showing components within the content delivery engine 120, according to some embodiments. The content delivery engine 120 may be hosted on dedicated or shared server machines (not shown) that are communicatively coupled to facilitate communications between the server machines. The components themselves may be communicatively coupled to each other and to various data sources, so as to allow information to be passed among the components or so as to allow the components to share and access common data. Furthermore, the components may access one or more databases (e.g., content consumption profiles 122) via database servers (not separately shown). In the example embodiment, the content delivery engine 120 includes a communication module 210, a sensor module 220, a device association module 230, a content consumption module 240, a content identification module 250, and a content delivery module 260. In some embodiments, the local content module 112 may include one or more of the modules 210, 220, 230, 240, 250, and 260.

The communication module 210, in an example embodiment, provides network communication functionality between the content delivery engine 120 and other computing devices, such as the user computing device 104, the content providers 130, and the third-party systems 140. In some embodiments, the communication module 210 facilitates communication over the Internet (e.g., the network 108) or other Internet Protocol (IP) based networks (e.g., IEEE 802 standards). In some embodiments, the communication module 210 facilitates communication to devices over cellular networks (e.g., to smartphone or tablet devices over a 3G/4G network). In other embodiments, the communication module 210 allows the content delivery engine 120 to communicate over both IEEE 802 standard-based network and a cellular network at the same time (e.g., connects to the inquiring user computing device 104 over the cellular network and connects to third-party websites over the 802 network).

In an example embodiment, the sensor module 220 provides functionality associated with analysis of sensor data of the user 102 from the sensors 116. The sensor data may come from a variety of types of sensors 116, such as GPS receivers (e.g., providing location data associated with the user computing devices 104) and biometric sensors (e.g., health and fitness data of the user 102). The sensor module 220 may receive raw data values from the sensors 116, and may analyze these values in conjunction with particular aspects of content consumption and presentation.

The device association module 230 associates various computing devices 104 with the user 102 (e.g., as a part of the pool 106). The device association module 230 may identify unique computing devices 104 using, for example, hardware processor serial number, mobile identification number (MIN) or mobile subscription identification number (MSIN), cookies, or IP address. In some embodiments, the user 102 may identify one or more computing devices 104 for association with the user 102 (e.g., through a device registration process with the content delivery engine 120). In some embodiments, the device association module 230 may automatically detect one or more computing device 104 used by the user 102. In some embodiments, the device association module 230 may receive device data from content providers 130 or third-party systems 140 identifying one or more computing devices 104 associated with the user 102. Each identified device 104 may be added to the pool 106, thereby generating a set of computing devices 104 associated with the user 102.

For example, the pool 106 may include a home television and a home nest device registered by the user 102, and a particular smartphone identified as associated with the user 102 by a cellphone service provider, and the device association module 230 may detect that the user 102 uses a particular desktop computer (e.g., based on the user 102 having logged into a trusted third-party application from that particular desktop computer). Various methods of device association are described in greater detail below.

The content consumption module 240, in an example embodiment, evaluates content consumption patterns of the user 102 as they use the computing devices 104 in the pool 106. More specifically, the content consumption module 240 evaluates aspects of content consumption such as the type of content consumed (e.g., subject matter evaluation), the times at which content is consumed (e.g., times of the day, days of the week, and so forth), on which device(s) 104 the content is consumed, and through which venues on those devices 104 the content is consumed (e.g., browser, media player, third-party application). The content consumption module 240 may work in conjunction with the local content modules 112 of various computing devices 104 to capture content consumption data for the user 102, receiving such content consumption data over the network 108 on a periodic basis, or as the user 102 consumes content. In some embodiments, the content consumption module 240 may receive content consumption data from the content providers 130 (e.g., identifying that the user 102 has accessed a particular content item, or background data on a particular content item).

The content consumption module 240 evaluates patterns of consumption conduct of the user 102 over time to determine content consumption preferences of the user 102. For example, the content consumption module 240 may determine that the user 102 typically consumes world news in the morning via their television and from a cable news provider, and that the user 102 typically consumes market news in the late afternoon during their evening commute via their smartphone. As such, the content consumption module 240 may build the content consumption profile 122 for the user 102 from the content consumption data.

The content identification module 250, in an example embodiment, receives or otherwise identifies new content (e.g., a "selected content item") to be presented to the user 102. In some embodiments, the selected content item is provided to the content delivery engine 120 from a content provider 130 or a third-party system 140 (e.g., an advertiser). In some embodiments, the selected content item is identified from content items offered by the content providers 130 and determined to be of interest to the user 102 (e.g., based on the content consumption profile 122 of the user 102). For example, the selected content item may be identified based on the types of content typically consumed by the user 102, or based on the content provider 130 frequented by the user 102.

The content delivery module 260, in an example embodiment, delivers the selected content item for presentation to the user 102 or otherwise presents the selected content item to the user 102. The content delivery module 260 may determine a target time to present the selected content item to the user 102 (e.g., based on historical times of content consumption in the content consumption profile 122). The content delivery module 260 may determine a target device on which to present the selected content item to the user 102 (e.g., based on historical device usage for content consumption in the content consumption profile 122). The content delivery module 260 may determine a target venue through which to present the selected content item to the user 102 (e.g., based on venue usage for content consumption in the content consumption profile 122).

In an example embodiment, the content delivery module 260 utilizes the content type of the selected content item to determine each of the target time, the target device, and the target venue with in that device based on the content consumption profile 122. Once determined, the content delivery module 260 delivers the selected content item for presentation at the target time, on the target device, and within the target venue. In some embodiments, presentation of the selected content item to the user 102 may include transmitting the selected content item to the target device (e.g., to the local content module 112 of one of the computing devices 104) for presentation to the user 102.

Figure 3:
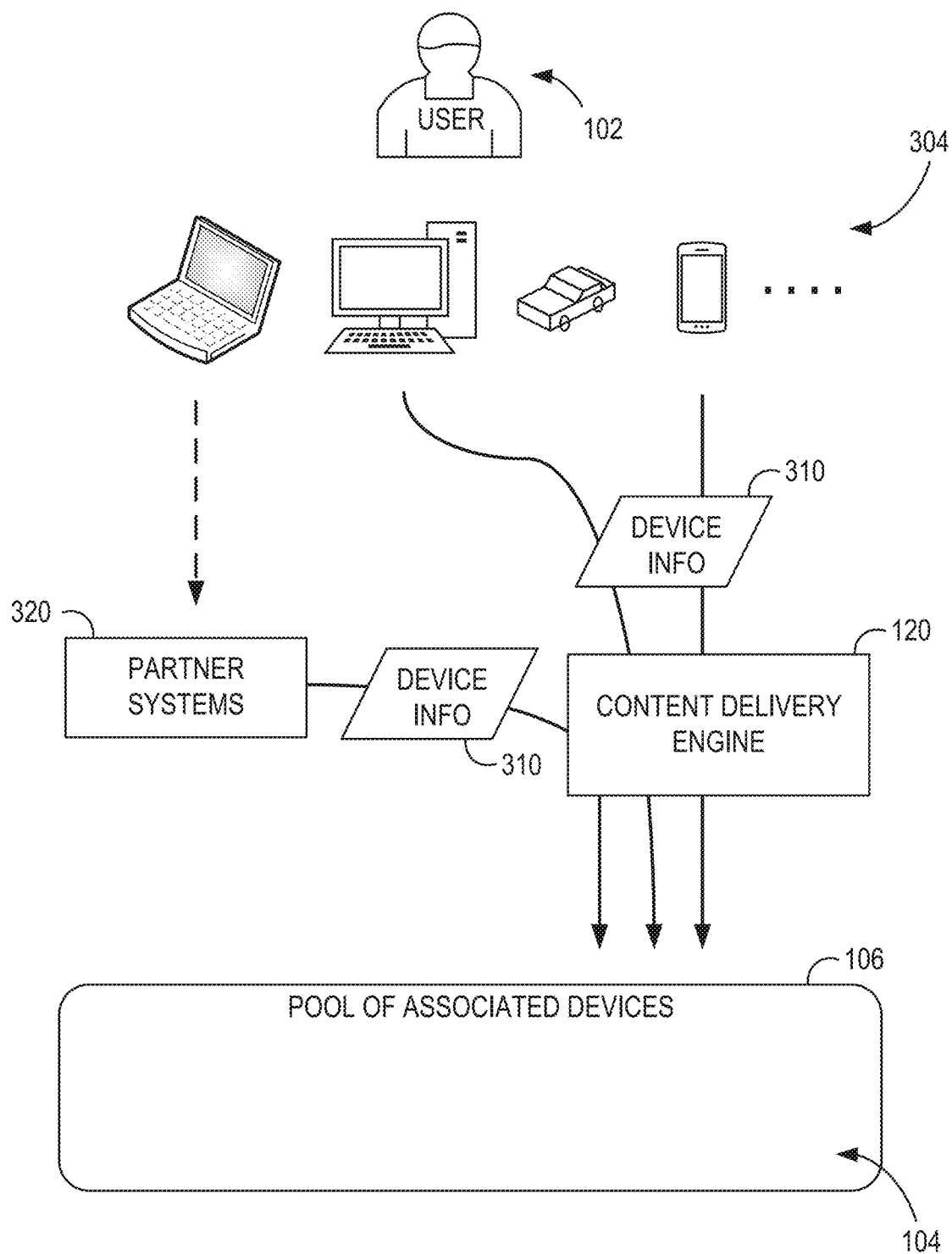
FIG. 3 is a workflow diagram depicting device association as performed by the content delivery engine.

FIG. 3 is a workflow diagram depicting device association as performed by the content delivery engine 120. In an example embodiment, the user 102 uses multiple computing devices 304 to consume various types of content during their daily lives. These devices 304 may be similar to the user computing devices 104, and may be varied in the type of device, as mentioned above with respect to FIG. 1. Initially, when the user 102 is new to the content delivery system 100, the content delivery system 100 may not yet associate any of the computing devices 304 with the user 102 (e.g., they may be "unassociated devices"). Through various association and discovery steps, the content delivery engine 120 receives device information 310 about the unassociated computing devices 304 and associates those devices 304 with the user 102 to create the user pool 106 of associated devices 104. Once the devices 104 are associated with the user 102, the content delivery engine 120 may use the associated devices 104 to evaluate content consumption patterns of the user 102 and deliver relevant content to the user 102 when the user 102 prefers, and via the device 104 and forum on which the user 102 prefers.

The content delivery engine 120 may use various methods of associating the computing devices 304 with the user 102. In one example embodiment, the user 102 self-identifies a computing device 304 with the content delivery engine 120. For example, the content delivery engine 120 may present a configuration interface (not separately depicted) to the user 102, allowing the user 102 to register devices 304 with the content delivery system 100 (e.g., via CPU serial number, IP address, mobile phone number, manufacturer serial number, and so forth). In some embodiments, this configuration interface may allow the user 102 to install the local content module 112 onto the device 304. The local content module 112 may then register the device 304 with the content delivery engine 120, thereby associating the device 304 with the user 102 and adding that device 304 to the pool 106 as an "associated device 104". The local content module 112 may transmit, to the content delivery engine 120, a user ID for the user 102 ("content delivery user ID") and a device ID associated with the device 304. The content delivery system 100 may use a fixed identifier associated with the device 304 (e.g., a CPU serial number), or may generate a unique identifier for the device 304 (e.g., a custom device ID).

In some embodiments, the content delivery engine 120 may automatically detect an association between a device 304 and the user 102. For example, the user 102 may log into the content delivery system 100 or into a partner system 320 (e.g., a content provider 130, a third-party system 140) from an unassociated device 304. At such time, the user 102 may identify themselves to that partner system 320, for example, through a user ID of the user 102 on that partner system 320 ("partner system user ID"). The partner system 320 may collect device information 310 from the unassociated device 304 and transmit the device information 310 to the content delivery engine 120 along with user information identifying the user 102. In some embodiments, one of the content delivery engine 120 and the partner system 320 may perform a mapping between a partner system user ID of the user 102 and a content delivery user ID of the user 102, thereby uniquely identifying the user 102 to the content delivery engine 120.

In some embodiments, device information 310 may include data such as a hardware identifier (e.g., a CPU serial number, a device serial number, a custom device ID), communications information (e.g., device IP address, cellular telephone number), hardware information (e.g., device manufacturer, device type, model, firmware version), and software information (e.g., operating system version, installed applications, content consumption venues).

In some embodiments, the content delivery engine 120 may associate a device 304 with the user 102 based on network proximity. For example, presume a first device 104 of the user 102 (e.g., a smartphone) has been previously associated with the user 102, and a second device 304 of the user 102 (e.g., a laptop computer) is not yet associated with the user 102. Also presume that both devices 104, 304 include Wi-Fi network adapters linked to a shared Wi-Fi or network router in a local area network (LAN) (not separately depicted). The content delivery engine 120 may detect the presence of the unassociated device 304 on the LAN via network communications information on the associated device 104 (e.g., arp table, routing table, LAN communication between the two devices 104, 304). In some embodiments, the Wi-Fi router may be associated with the user 102, thereby making other devices 304 on the LAN available as prospective associated devices 104.

In some embodiments, upon detection of a device 304 prospectively associated with the user 102, the user 102 may be prompted to confirm the association of the device 304, and may be prompted to install the local content module 112 onto the device. As such, the unassociated device 304 is subsequently added to the pool 106 of associated devices 104 for the user 102. The pool 106 of associated devices 104 may be stored as a part of the content consumption profile 122 of the user 102.

Figure 4:
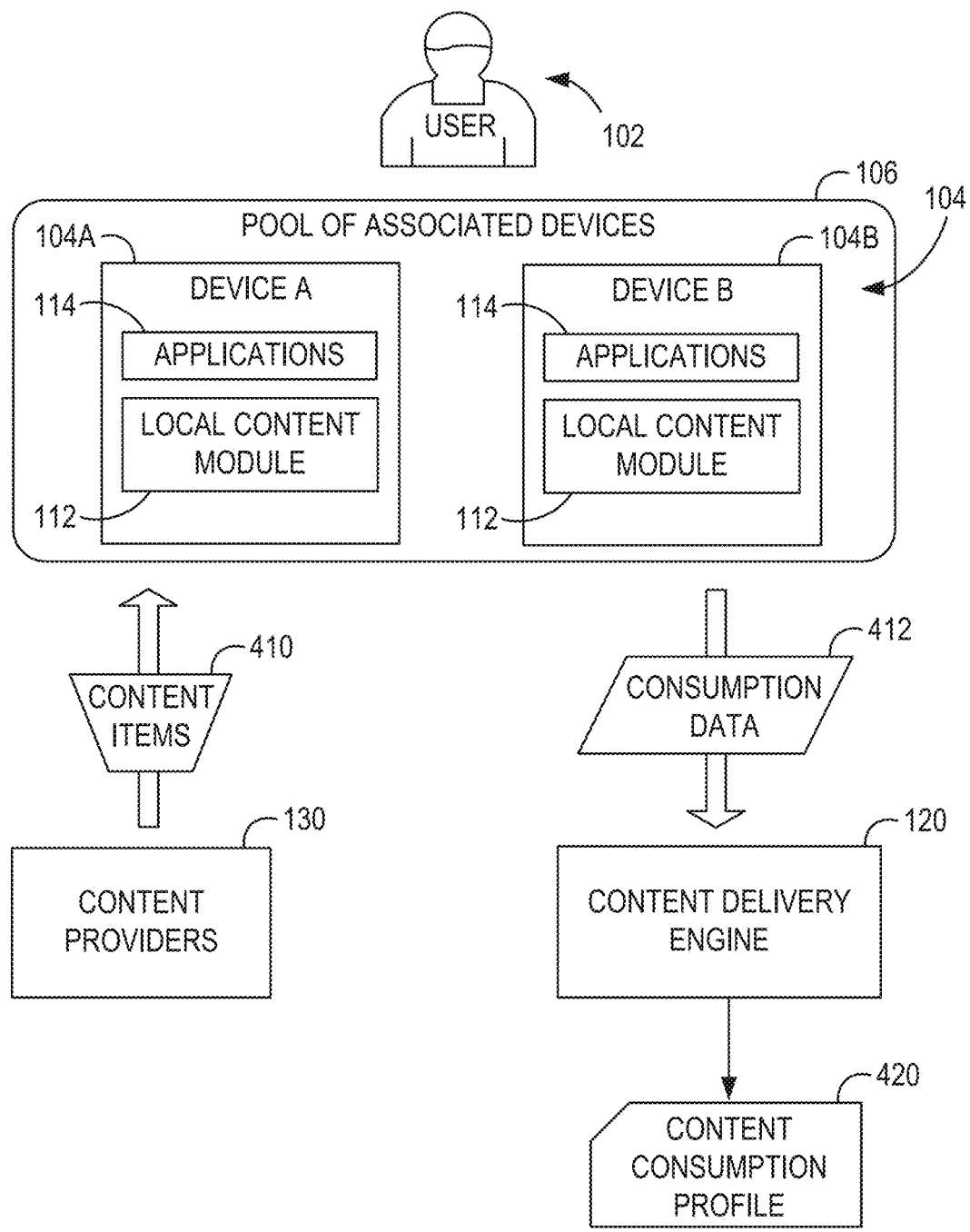
FIG. 4 is a workflow diagram depicting content consumption as performed by the user, and related evaluation of such content consumption as performed by the content delivery engine.

FIG. 4 is a workflow diagram depicting content consumption as performed by the user 102, and related evaluation of such content consumption as performed by the content delivery engine 120. In an example embodiment, the pool 106 of associated devices 104 for the user 102 includes a device A 104A and a device B 104B. While only two associated devices 104 are depicted in FIG. 4, it should be understood that there may be more or fewer associated devices 104.

During their daily routine, the user 102 uses the associated devices 104 to consume content (e.g., content items 410) provided by the content providers 130. For example, the content items 410 may include web page content, television content (e.g., broadcast, cable, Internet-based programming), radio programs (e.g., broadcast, satellite, Internet-based), podcasts, e-books, social media, electronic mail ("email"), and so forth. The user 102 uses one or more of the devices 104 to consume the content items 410 (e.g., viewing through the display 110, listening via an audio speaker).

Further, within each device 104, the content items 410 may be presented through a "venue" within the device 104. For example, web page content items 410 may be viewed through a browser on the device 104, television content may be viewed through a third-party application installed on the device 104, radio programs may be heard through a media player installed on the device 104, email may be downloaded and read via an email application installed on the device 104, and so forth.

In an example embodiment, as the user 102 consumes the content items 410, the local content module 112 collects consumption data 412 and transmits that consumption data 412 to the content delivery engine 120. Consumption data 412 may include, for example, user-identifying data (e.g., a user ID of the user 102), consumption time data (e.g., identifying when the content item 410 was consumed, how long the user 102 spent consuming the content item 410), consumption device data (e.g., identifying which device 104 was used to consume the content item 410), consumption venue data (e.g., identifying which venue within the device 104 was used to consume the content item 410), as well as content data associated with the consumed content item 410.

In an example embodiment, content data may include the content item 410 itself, one or more subject matters associated with the content item 410 (e.g., subject matter classifications, sub-classifications of the content item 410), a type of the content item (e.g., web page content, video content, audio content, email content, text content, and so forth), and the source of the content item 410 (e.g., the content provider 130). In some embodiments, the local content module 112 may analyze the content item 410 to determine the one or more subject matters, or the type of the content item 410. For example, the local content module 112 may analyze the title or contents of a web page article to determine that the article is related to a category of "market news", or more specifically to a sub-category of "banking industry". In some embodiments, the content delivery engine 120 may perform this subject matter analysis of the content item 410.

In an example embodiment, each content item 410 consumed by the user 102 on any of their associated devices 104 results in the transmission of the consumption data 412 to the content delivery engine 120. In other embodiments, the local content module 112 may collect and aggregate consumption data 412 over time, sending aggregated consumption data 412 to the content deliver engine 120 at periodic intervals. The content delivery engine 120 receives the consumption data 412 from the associated devices 104. The content delivery engine 120 may store the raw consumption data 412 as a part of a content consumption profile 420 of the user 102. This consumption data 412 for many content items 410 may be collected over time for subsequent analysis, as described below.

In an example embodiment, the content delivery engine 120 analyzes all of the consumption data 412 received for the user 102 to determine various consumption preferences exhibited by the user 102. In some embodiments, the content delivery engine 120 determines one or more preferred consumption times (e.g., time of day, window of time) for consuming content. For example, the user 102 may frequently read financial news when they first arrive at work during the week (e.g., between 8 am and 9 am on weekdays). The content delivery engine 120 may determine a preferred consumption time by, for example, computing a percentage of consumption times in the 8 am-9 am window as compared to all consumption times of the user 102. For example, 18.5% of all content consumed by the user 102 may be consumed within that window. As such, the content delivery engine 120 may store that window in the content consumption profile 420 as a preferred time to consume content.

In some embodiments, the content delivery engine 120 determines one or more preferred devices 104 for content consumption. Continuing the example above, the user 102 may utilize their desktop computing device (e.g., device A 104A) 55% of the time when consuming content. As such, the content deliver engine 120 may determine a preferred consumption device by, for example, computing a percentage of use of each associated device 104 for consuming content relative to the other devices 104 in the pool. This device may be stored, in the content consumption profile 420, as a preferred device through which to consume content.

Similarly, in some embodiments, the content delivery engine 120 may determine a preferred venue within each device 104 for content consumption. For example, the user 102 may utilize a web browser 45% of the time when consuming content, a video media player 35% of the time, and an email app 30% of the time. As such, the content delivery engine 120 may determine a preferred consumption venue (e.g., the web browser) by, for example, computing a percentage of use of each associated venue within a particular device 104, or across all associated devices 104. This venue may be stored, in the content consumption profile 420, as a preferred venue through which to consume content.

Further, in some embodiments, the content delivery engine 120 may determine one or more preferred subject matters for content consumption. For example, 30% of the content consumed by the user 102 may be in the category of "entertainment", 25% may be in the category of "sports", 20% may be in the category of "politics", with the remaining spread amongst other categories. As such, the content delivery engine 120 may determine a preferred subject matter by, for example, computing a percentage of content items 410 of a given subject matter consumed relative to all consumed content items 410. These subject matters may be stored, in the content consumption profile 420, as preferred subject matters of the user 102.

In some embodiments, the content delivery engine 120 may combine multiple aspects of content consumption (e.g., consumption time, device, venue, subject matter) to further refine consumption preferences of the user 102. For example, the content delivery engine 120 may determine preferences relative to a specific subject matter, such as "global politics". As such, the content delivery engine 120 may identify only the consumption data 412 of the user 102 having the subject matter category of "global politics", and this refined set of consumption data may then be used to determine a preferred consumption time, device, or venue.

For example, consider determining a preferred consumption time for the "global politics" category. As mentioned above, the user 102 may exhibit a preferred device of their desktop computer device 104A when not limiting by subject matter (e.g., 55%). However, the user 102 may consume "global politics" content primarily when they are at home watching a cable news network on their television (e.g., device B 104B). As such, when limiting the historical consumption data to only subject matter of "global politics", the content delivery engine 120 may compute a preferred device as device B 104B because the user 102 consumes 85% of "global politics" content through that device. Similarly, the content delivery engine 120 may determine a preferred consumption venue, a preferred consumption time, or a preferred content provider specific to the given subject matter. Such preference data may be useful, for example, when a new content item of a particular subject matter has been identified for presentation to the user 102.

Similarly, the content delivery engine 120 may limit the historical consumption data 412 to only a particular device 104. As such, the content delivery engine 120 may then determine a preferred subject matter, consumption venue, consumption time, or content provider specific to that particular device 104. Such preference data may be useful, for example, when a new content item is to be delivered to a particular device 104 of the user.

Similarly, the content delivery engine 120 may limit the historical consumption data 412 to only a particular time. As such, the content delivery engine 120 may then determine a preferred subject matter, consumption device, consumption venue, or content provider specific to that particular time. Such preference data may be useful, for example, when a new content item is to be delivered to the user 102 at a particular time.

Figure 5:
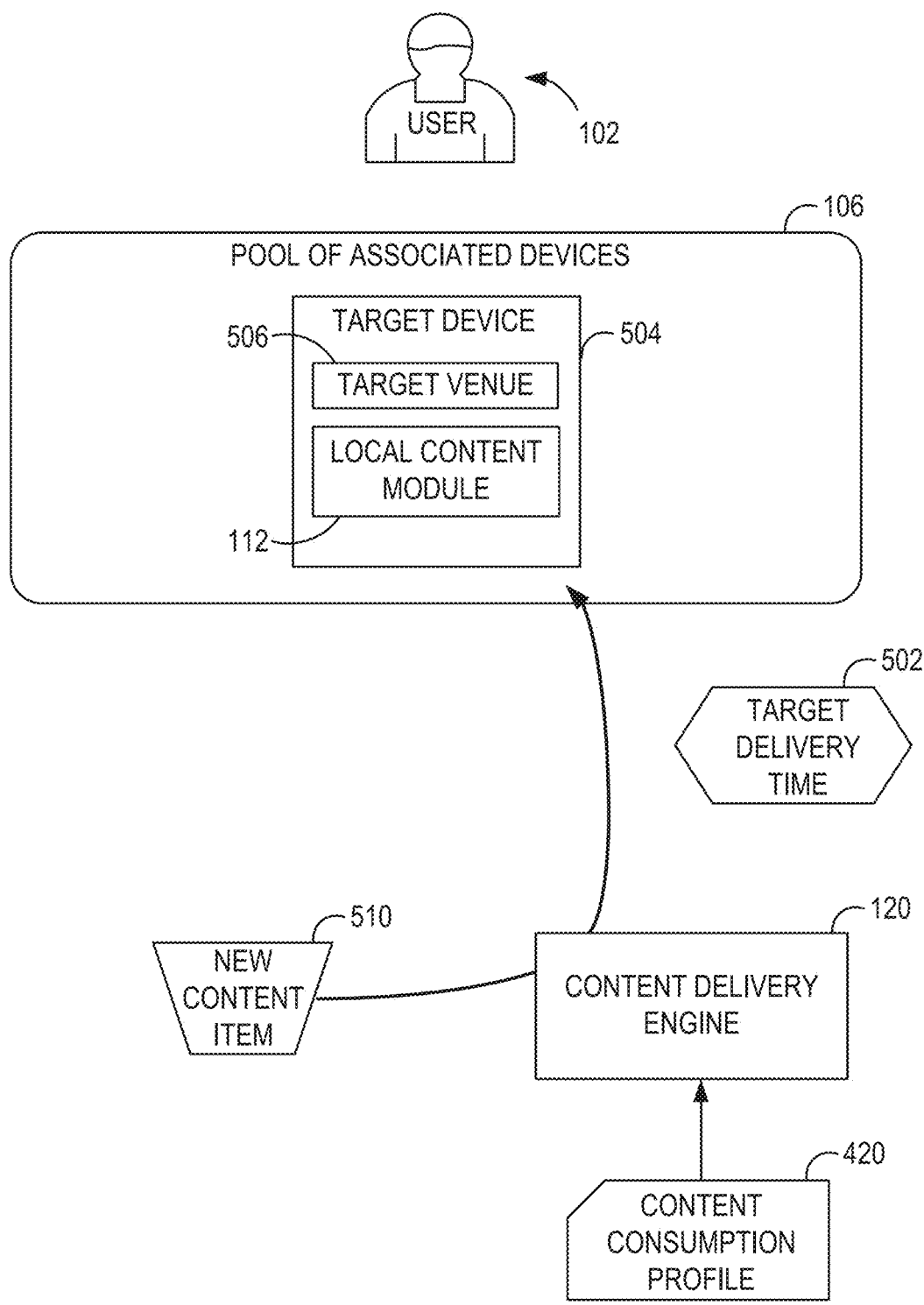
FIG. 5 is a workflow diagram illustrating the presentation of a new content item to the user by the content delivery engine.

FIG. 5 is a workflow diagram illustrating the presentation of a new content item 510 to the user 102 by the content delivery engine 120. In an example embodiment, the content delivery engine 120 receives or otherwise identifies the new content item 510. In some embodiments, the new content item 510 may include subject matter data identifying, for example, a category or sub-category of the new content item 510. In other embodiments, the content delivery engine 120 may determine the subject matter of the new content item 510 (e.g., as described above with reference to the content items 410).

In an example embodiment, the content delivery engine 120 determines one or more of a target delivery time 502, a target device 504, and a target venue 506 within that target device 504. The target device 504 is selected from the pool 106 of associated devices 104. More specifically, the content delivery engine 120 determines the target delivery time 502, target device 504, and target venue 506 based on the preference data within content consumption profile 420 for the user 102. While the examples shown in FIGS. 4 and 5 depict preference data being computed by the content delivery engine 120 and stored in the content consumption profile 420 of the user 102, it should be understood that the preference computations described herein may not be pre-computed. For example, any of the preference computations described herein may be determined after the new content item 510 is identified for presentation to the user 102.

In an example embodiment, the content delivery engine 120 determines the target delivery time 502, the target device 504, and the target venue 506 based on the subject matter of the new content item 510. In other words, and as described above in reference to FIG. 4, the content delivery engine 120 may compute or retrieve the preferred time, device, and venue as refined using only the historical consumption data 412 matching the subject matter of the new content item 510.

Once the target delivery time 502, target device 504, and target venue 506 are identified, the content delivery engine 120 stages the new content item 510 for presentation to the user 102. In some embodiments, the content delivery engine 120 may transmit the new content item 510 to the local content module 112 of the target device 504, along with the target delivery time 502 and the target venue 506. Accordingly, the local content module 112 then presents the new content item 510 to the user 102 at or after the target delivery time 502.

In other embodiments, the content delivery engine 120 may wait until at or after the target delivery time 502 before transmitting the new content item 510 to the target device 504. In some embodiments, the target device 504 may immediately present the new content item 510 to the user 102 (e.g., directly through the target venue 506, or via the local content module 112 and then to the target venue 506). In some embodiments, the target device 504 may be offline, inactive, powered off, inaccessible, or otherwise not in use by the user 102 at the target delivery time 502. As such, the content delivery engine 120 may wait until after the target delivery time 502, and until the target device 504 becomes in use by the user 102, before transmitting the new content item 510 to the target device 504 for presentation.

In some embodiments, the target device 504 may be restricted based on a content type of the new content item 510. For example, if the new content item 510 includes video, then the content delivery engine 120 may limit selection of the target device 504 to only devices 104 that are capable of displaying video (e.g., that include a target venue 506 configured to present video).

Figure 6:
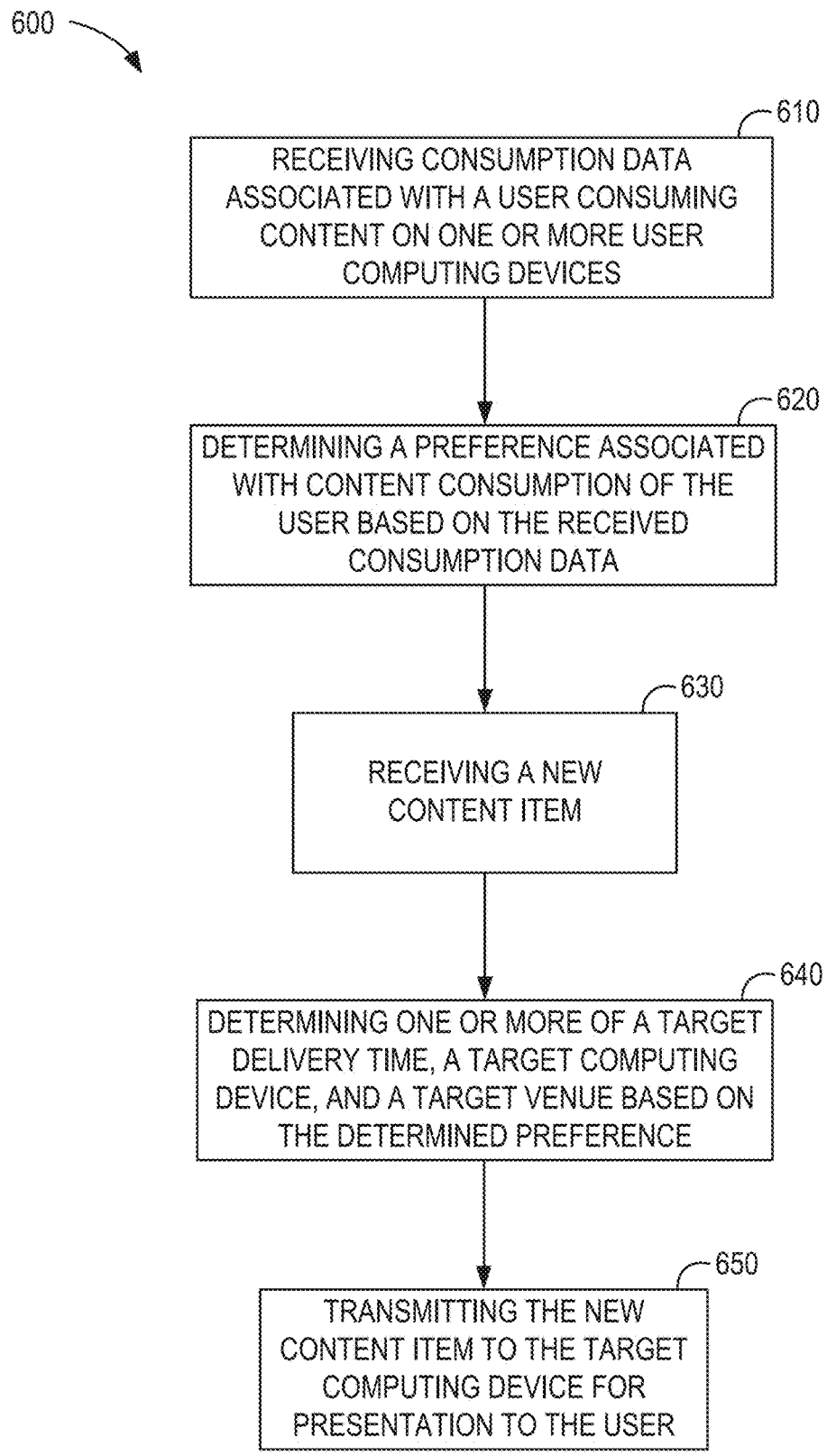
FIG. 6 illustrates an example computer-implemented method for detecting life events of a person, such as the user.

FIG. 6 illustrates an example computer-implemented method 600 for delivering content for presentation to the user 102. The computer-implemented method 600, hereafter referred to as "the method 600," is performed by a computing device comprising at least one hardware processor and a memory. In an example embodiment, the method 600 includes receiving consumption data associated with a user consuming content on one or more user computing devices (see operation 610). The method 600 also includes determining a preference associated with content consumption of the user based on the received consumption data, the preference including one or more of a delivery time, a computing device of the one or more user computing devices, and a venue (see operation 620). The method 600 further includes receiving a new content item (see operation 630). The method 600 also includes determining one or more of a target delivery time, a target computing device of the one or more user computing devices, and a target venue based on the determined preference (see operation 640). The method further includes transmitting the new content item to the target computing device for presentation to the user (see operation 650).

In some embodiments, the method 600 also includes detecting an association between the user and the target computing device, and adding the target computing device to a pool of computing devices associated with the user, wherein said determining further includes determining the target computing device from the pool of computing devices. In some embodiments, detecting an association between the user and the target computing device further includes receiving a login request from the target computing device, the login request includes a user identifier associated with the user, identifying a hardware identifier associated with the target computing device based on the received login request, and associating the user with the target computing device using the hardware identifier. In some embodiments, detecting an association between the user and the target computing device further includes receiving a registration of the target computing device performed by the user.

In some embodiments, the method 600 further includes identifying a consumption time associated with the consumption data, the consumption time being a time at which the user consumed the content, and wherein determining a preference further includes determining a preferred time to consume content, and wherein determining one or more of a target delivery time, a target computing device, and a target venue based on the determined preference further includes determining a target delivery time based on the preferred time. In some embodiments, transmitting the new content item to the target computing device further includes transmitting the new content item to the target computing device after the target delivery time has arrived.

In some embodiments, the method 600 further includes identifying a consumption device of the one or more user computing devices associated with the consumption data, the consumption device being a computing device on which the user consumed the content, and wherein determining a preference further includes determining a preferred device of the one or more user computing devices on which to consume content, and wherein determining one or more of a target delivery time, a target computing device, and a target venue based on the determined preference further includes determining the target device based on the preferred device.

Figure 7:
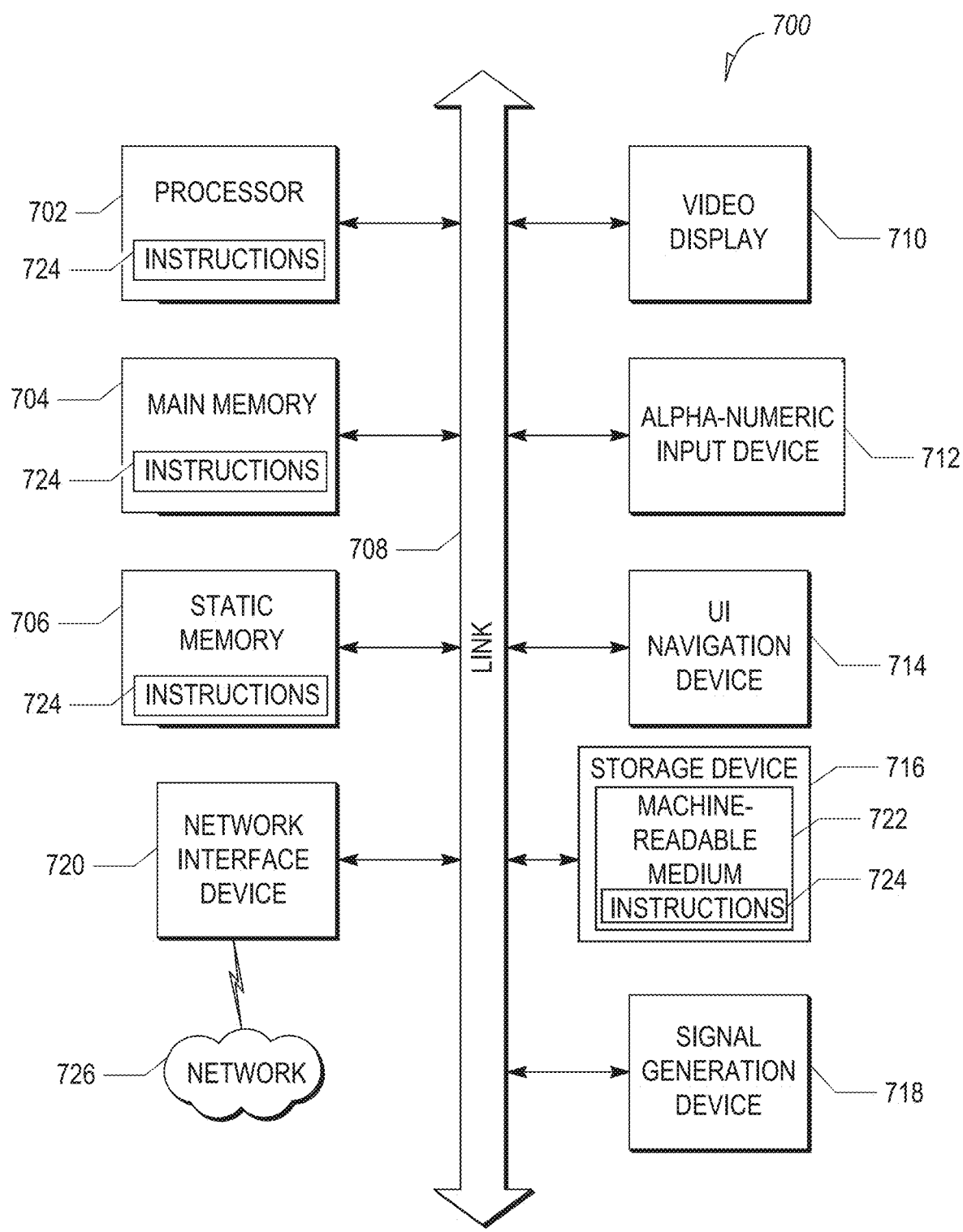
FIG. 7 is a block diagram illustrating a machine in the example form of a computer system, within which a set or sequence of instructions can be executed to cause the machine to perform any one of the methodologies discussed herein, according to an example embodiment.

FIG. 7 is a block diagram illustrating a machine in the example form of a computer system 700, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes at least one processor 702 (e.g., a central processing unit (CPU). a graphics processing unit (GPU) or both, processor cores, compute nodes, etc.), a main memory 704 and a static memory 706, which communicate with each other via a link 708 (e.g., bus). The computer system 700 can further include a video display unit 710, an alphanumeric input device 712 (e.g., a keyboard), and a user interface (UI) navigation device 714 (e.g., a mouse). In one embodiment, the video display unit 710, alphanumeric input device 712, and UI navigation device 714 are incorporated into a touch-screen display. The computer system 700 can additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, within the static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., instructions 724) for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system comprising:
   at least one hardware processor; and
   a memory storing instructions that, when executed by the at least one hardware processor, cause the at least one hardware processor to perform operations comprising:
      receiving a login request from a computing device, the login request including a user identifier associated with a user;
      based on receiving the login request from the computing device:
         identifying the computer device as prospectively associated with the user;
         transmitting a request to the user to confirm the association of the computing device with the user; and
         subsequent to receiving a confirmation of the association in response to the request,
            storing the computer device, as registered as part of a pool of user computing devices with the user, in a consumption user profile;
      receiving consumption data associated with the user consuming content on the pool of user computing devices,
      determining a plurality of preferences associated with content consumption of the user based on the received consumption data, the preferences including a delivery time preference, a computing device preference of the pool of user computing devices, and a venue preference of a plurality of venues operable on the pool of user computer devices;
      receiving a new' content item;
      determining a target computing device of the pool of user computing devices, and a target venue for the new content item based on the determined plurality of preferences; and
      transmitting the new content item to the target venue on the target computing device for presentation to the user.

2. The system of claim 1, the operations further comprising:
   detecting an association between the user and another computing device; and
   adding the another computing device to the pool of computing devices.

3. The system of claim 2, wherein detecting an association between the user and the another computing device further includes receiving a registration of theanother computing device performed by the user.

4. The system of claim 1, the operations further comprising:
   identifying a consumption time associated with the consumption data, the consumption time being a time at which the user consumed content, wherein the delivery time preference is based on the consumption time.

5. The system of claim 4, the operations further comprising: determining a target delivery time for the new content based on the delivery time preference; and wherein transmitting the new content item to the target computing device further includes transmitting the new content item to the target computing device after the target delivery time has arrived.

6. A computer-implemented method comprising:
   receiving a login request from a computing device, the login request including a user identifier associated with a user;
   based on receiving the login request from the computing device:
      identifying the computer device as prospectively associated with the user;
      transmitting a request to the user to confirm the association of the computing device with the user;
      subsequent to receiving a confirmation of the association in response to the request, storing the computer device, as registered as part of a pool of user computing devices with the user, in a consumption user profile;
   receiving consumption data associated with the user consuming content on the pool of user computing devices;
   determining a plurality of preferences associated with content consumption of the user based on the received consumption data, the preferences including a delivery time preference, a computing device preference of the pool of user computing devices, and a venue preference of a plurality of venues operable on the pool of user computer devices;
   receiving a new content item,
   determining a target computing device of the pool of user computing devices, and a target venue for the new content item based on the determined plurality of preferences; and
   transmitting the new' content item to the target venue on the target computing device for presentation to the user.

7. The method of claim 6, further comprising:
   detecting an association between the user and another computing device; and
   adding the another computing device to the pool of computing devices.

8. The method of claim 7, wherein detecting an association between the user and the another computing device further includes receiving a registration of theanother computing device performed by the user.

9. The method of claim 6, further comprising:
   identifying a consumption time associated with the consumption data, the consumption time being a time at which the user consumed content, wherein the delivery time preference is based on the consumption time.

10. The method of claim 9, further comprising:
    determining a target delivery time for the new content based on the delivery time preference; and
    wherein transmitting the new content item to the target computing device further includes transmitting the new content item to the target computing device after the target delivery time has arrived.

11. A non-transitory computer-readable storage medium, the computer-readable storage medium including instructions that, when executed by a computer, cause the computer to perform operations comprising:

receiving a login request from a computing device, the login request including a user identifier associated with a user;

based on receiving the login request from the computing device:

identifying the computer device as prospectively associated with the user;

transmitting a request to the user to confirm the association;

subsequent to receiving a confirmation of the association in response to the request, storing the computer device, as registered as part of a pool of user computing devices with the user, in a consumption user profile;

receiving consumption data associated with the user consuming content on the pool of user computing devices, determining a plurality of preferences associated with content consumption of the user based on the received consumption data, the preferences including a delivery time preference, a computing device preference of the pool of user computing devices, and a venue preference of a plurality of venues operable on the pool of user computer devices;

receiving a new content item;

determining a target computing device of the pool of user computing devices, and a target venue for the new content item based on the determined plurality of preferences; and transmitting the new content item to the target venue on the target computing device for presentation to the user.

12. The non-transitory computer-readable storage medium of claim 11, the operations further comprising:

detecting an association between the user and another computing device; and adding the another computing device to the pool of computing devices.

13. The non-transitory computer-readable storage medium of claim 11, the operations further comprising:

identifying a consumption time associated with the consumption data, the consumption time being a time at which the user consumed content, wherein the delivery time preference is based on the consumption time.

14. The non-transitory computer-readable storage medium of claim 13, the operations further comprising: determining a target delivery time for the new content based on the delivery time preference; and wherein transmitting the new content item to the target computing device further includes transmitting the new content item to the target computing device after the target delivery time has arrived.

* * * * *

UNITED STATES PATENT AND TRADEMARK OFFICE
CERTIFICATE OF CORRECTION

PATENT NO. : 10,848,578 B1  
APPLICATION NO. : 15/484419  
DATED : November 24, 2020  
INVENTOR(S) : Gracey et al.

Page 1 of 1

It is certified that error appears in the above-identified patent and that said Letters Patent is hereby corrected as shown below:

In the Claims

In Column 15, Line 39, in Claim 1, delete "devices," and insert --devices;-- therefor In Column 15, Line 47, in Claim 1, delete "new'" and insert --new-- therefor In Column 16, Line 35, in Claim 6, delete "item," and insert --item;-- therefor In Column 16, Line 41, in Claim 6, delete "new'" and insert --new-- therefor In Column 17, Line 17, in Claim 11, delete "devices," and insert --devices;-- therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*